W. F. WARNER.
ARC LAMP.
APPLICATION FILED JUNE 25, 1906.
914,684.
Patented Mar. 9, 1909.
6 SHEETS—SHEET 1.
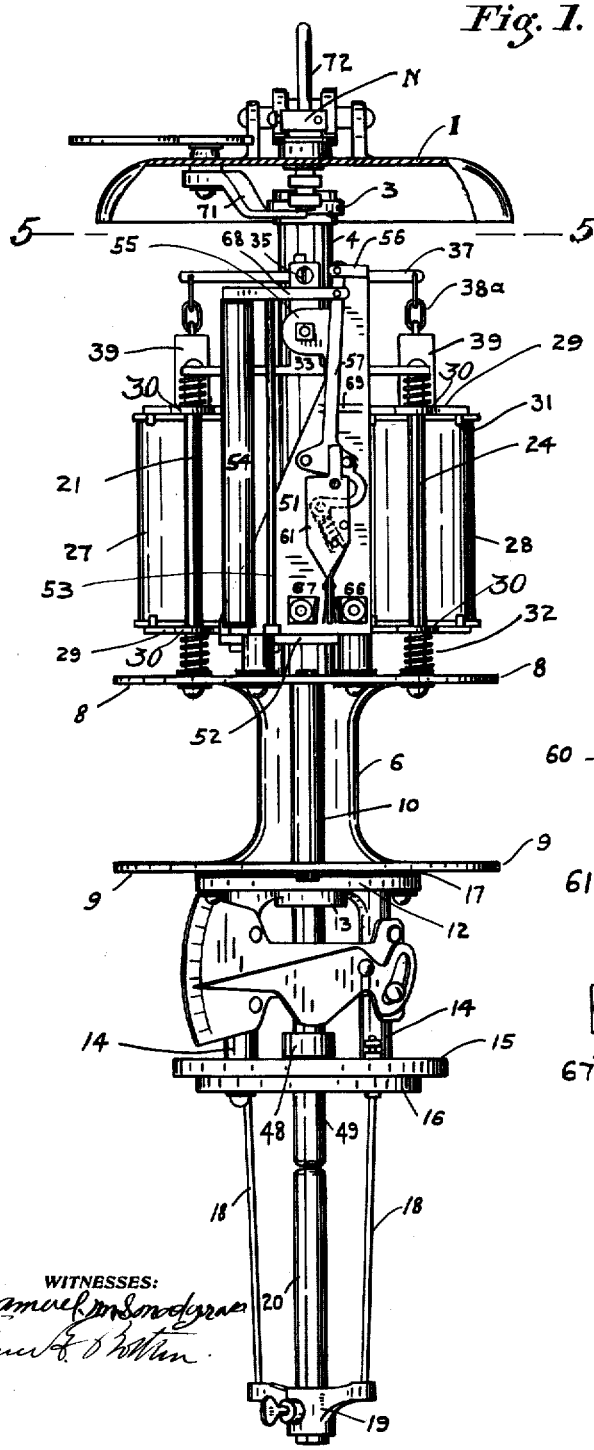
Fig. 1.
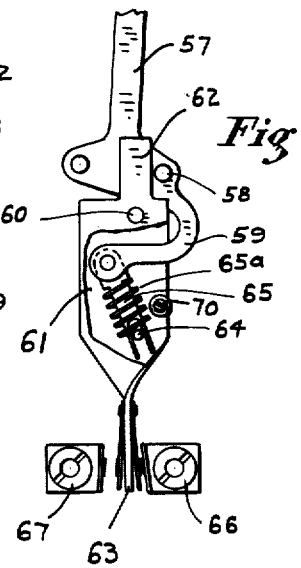
Fig. II.
WITNESSES:
INVENTOR
William F. Warner
BY
Thomas L. Ryan
ATTORNEY

W. F. WARNER.
ARC LAMP.
APPLICATION FILED JUNE 25, 1906.

914,684.

Patented Mar. 9, 1909.
6 SHEETS—SHEET 2.

WITNESSES:

INVENTOR
William F. Warner
BY
Thomas R. Ryan
ATTORNEY

W. F. WARNER.
ARC LAMP.
APPLICATION FILED JUNE 25, 1906.
914,684.
Patented Mar. 9, 1909.
6 SHEETS—SHEET 3.
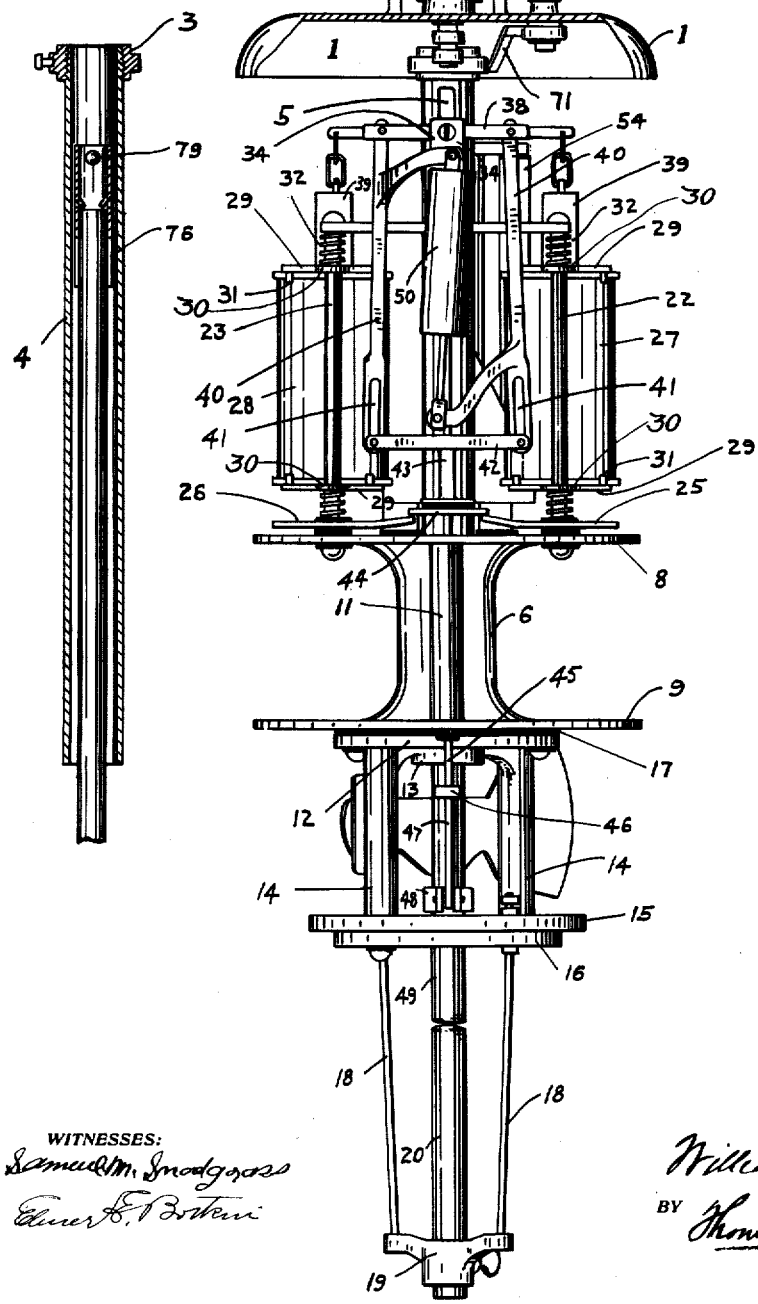
WITNESSES:
INVENTOR
William F. Warner
BY Thomas L. Ayres
ATTORNEY

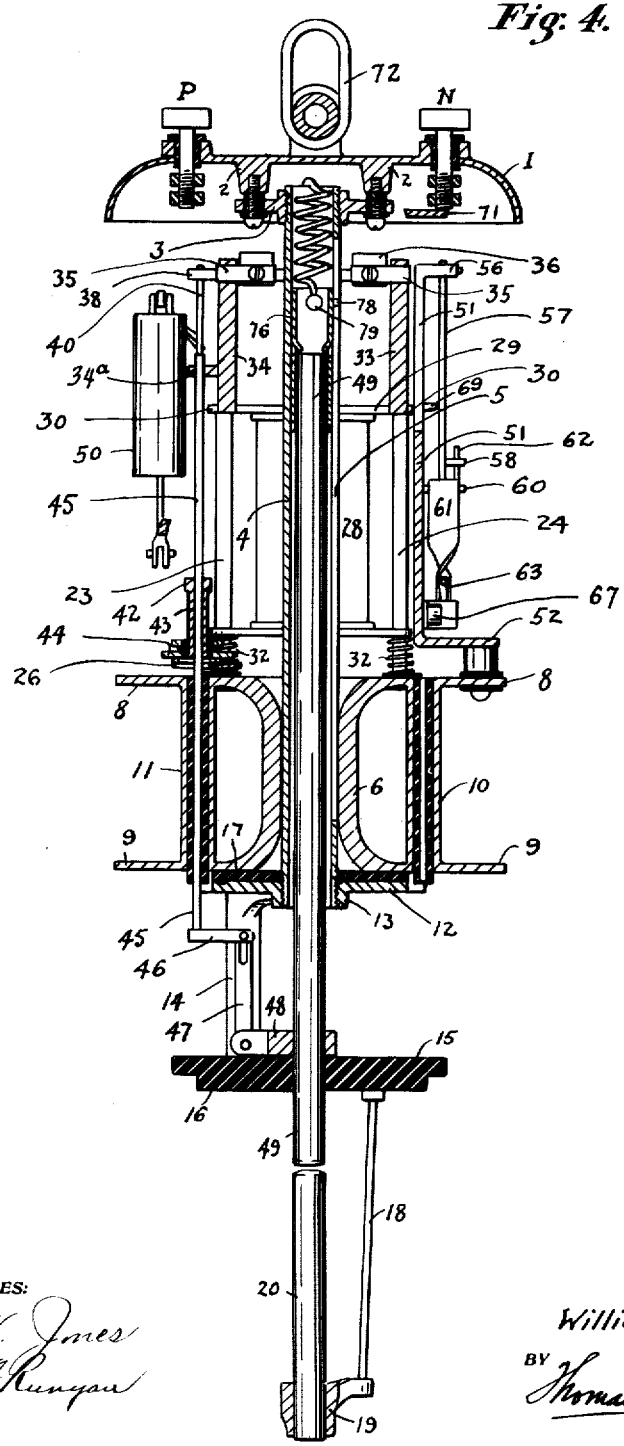

W. F. WARNER.
ARC LAMP.
APPLICATION FILED JUNE 25, 1906.
914,684.
Patented Mar. 9, 1909.
6 SHEETS—SHEET 5.
*Fig. 6.*
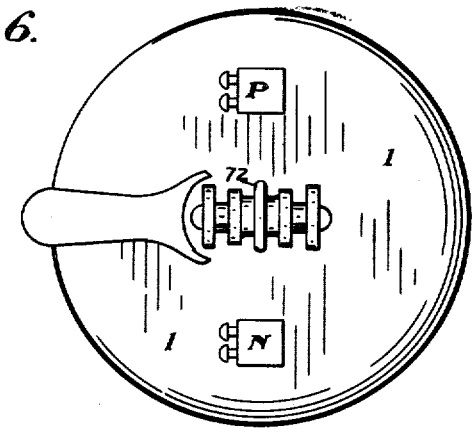
*Fig. 12.*
*Fig. 13.*
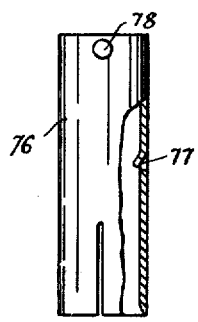
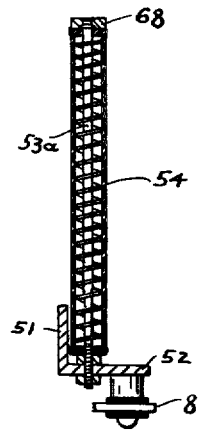
*Fig. 5.*
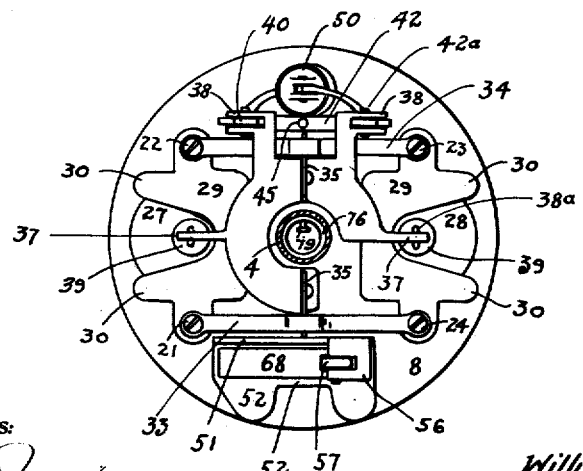
WITNESSES:
John W. Jones
Arthur F. Runyan
INVENTOR
William F. Warner
BY Thomas L. Ryan
ATTORNEY

UNITED STATES PATENT OFFICE.

WILLIAM F. WARNER, OF MUNCIE, INDIANA, ASSIGNOR TO WARNER ARC LAMP COMPANY, OF MUNCIE, INDIANA, A CORPORATION.

ARC-LAMP.

No. 914,684.　　　Specification of Letters Patent.　　　Patented March 9, 1909.

Application filed June 25, 1906. Serial No. 323,325.

*To all whom it may concern:*

Be it known that I, WILLIAM F. WARNER, a citizen of the United States, residing in the city of Muncie, in the county of Delaware and State of Indiana, have invented a new and useful Arc-Lamp, of which the following is a specification.

My invention relates to improvements in electric arc lamps in which the regulation of the lamp is rendered independent of the strength of the current, and consists in a new means for operating a clutch so as to release the carbon and restrike the arc of a certain length and at certain predetermined intervals irrespective of the consumption of the electrodes and consequently of variation of the arc voltage.

I have shown the invention embodied in the lamp mechanism herein described.

My invention is clearly described and illustrated in the accompanying specification and drawings, in which similar letters and numerals of reference refer to similar parts throughout the several views.

Figure 2:
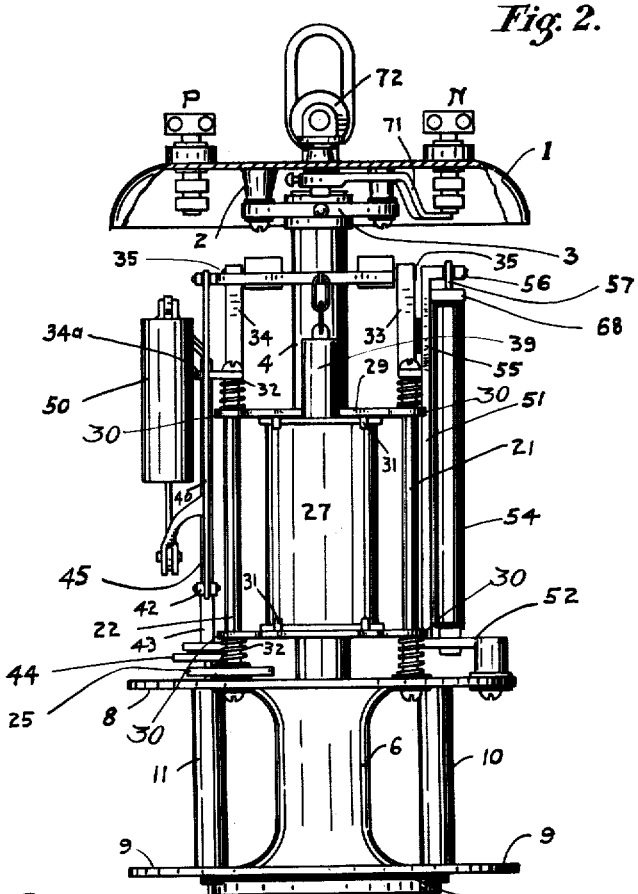
Figure 9:
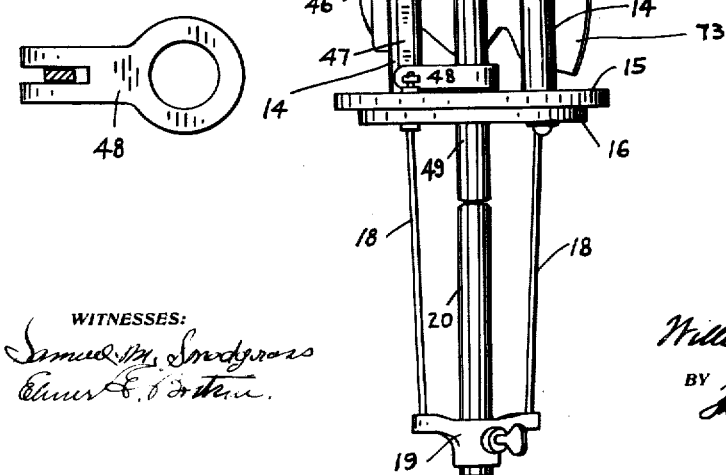
Figure 10:
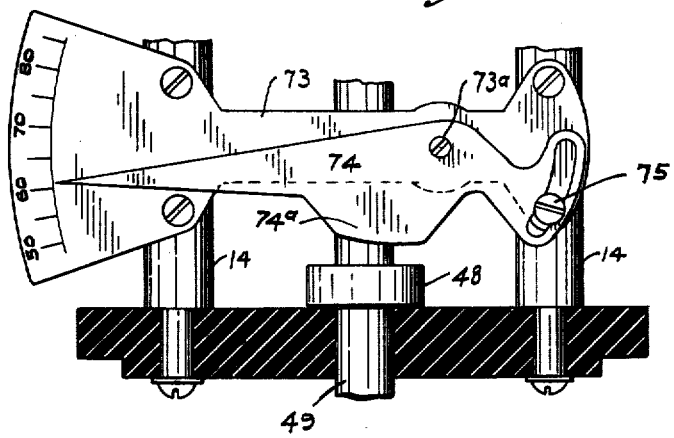
Figure 14:
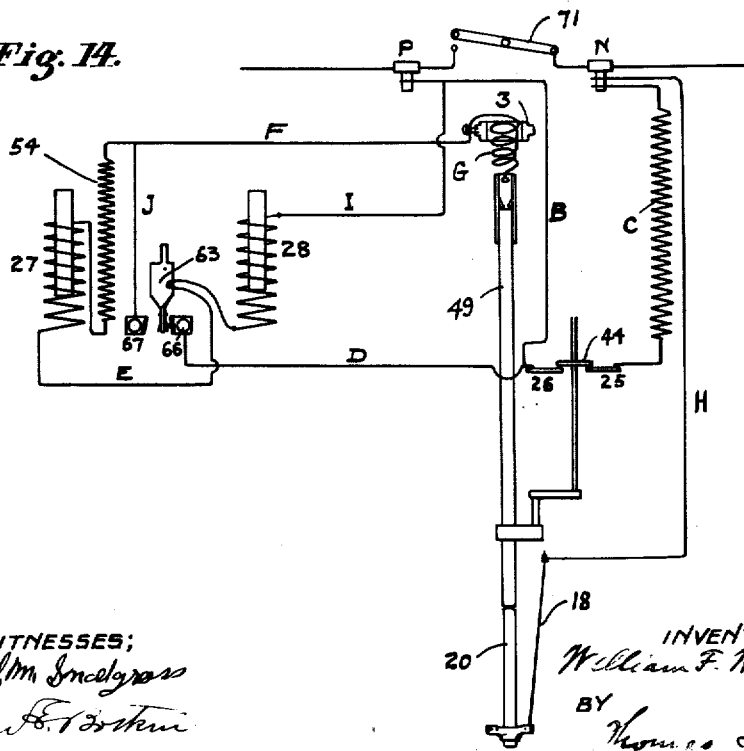

Figure 1 is a front view, Fig. 2 is a side view, and Fig. 3 is a rear view of my improved arc lamp complete, with jacket and glass-ware removed and in each view the crown plate being shown as having a portion thereof broken away. Fig. 4 is a vertical central sectional view of Fig. 2. Fig. 5 is a horizontal sectional view on the line 5—5 Fig. 1. Fig. 6 is a top plan view of Fig. 1. Fig. 7 is a detached vertical sectional view of the sheath-tube. Fig. 8 is a detached elevation of the sheath-tube and carbon-holder removed. Fig. 9 is a detached enlarged view of the carbon-grip removed. Fig. 10 is an enlarged detached view of the regulator removed. Fig. 11 is a detached enlarged view of the snap-switch removed. Fig. 12 is a detached vertical central sectional view of the heat coil removed. Fig. 13 is a detached enlarged view of the carbon-holder removed. Fig. 14 is a diagrammatic view showing the system of wiring and the courses of the electrical circuits.

1 designates the crown-plate, circular in form and provided with the downwardly extending continuous flange adapted to afford a water shed for the mechanism below, also to receive the jacket and inclose the working parts immediately below. Depending from the inner portion of the crown-plate and formed integral therewith are the bosses 2. Secured to these bosses by suitable screws and insulated therefrom is the collar 3 into which is screwed and which supports the metallic sheath-tube 4 and provided with the longitudinal continuous slot 5 in one side thereof, as plainly shown in Fig. 8, the function of which slot will be hereinafter pointed out.

6 designates the circular metallic center table with ample flanges 8 and 9 and having central vertical opening through which is freely inserted the sheath-tube as plainly shown in Fig. 4. The tubular columns 10 and 11 formed integral with and connecting the flanges are insulated upon their interiors and perform the functions hereinafter described.

In assembling the framework of my lamp the sheath-tube is secured, as above described, to the crown-plate, then its lower end is passed through the center table and screwed into the support-plate 12 which is also circular in form, metallic, and provided with the enlarged central portion 13 threaded on its interior to receive the sheath-tube and provided with the downwardly extending stems 14 formed integral therewith, and to the bottoms of which stems are secured rigidly the disk 15 made of non-conducting and heat-resisting material such as slate or lava and having the circular continuous flange 16 on its under side to which a suitable glass globe for inclosing the arc is adapted to bear. The center of this disk is suitably bored for the easy passage of the movable carbon whereby the same is retained slidably in correct position. The center-table is then secured in proper position on the support-plate 12 but insulated therefrom by the layer of insulation 17.

Suitably secured to the disk 15 are the depending metallic rods 18 which support, at proper distance below the collar 19 provided with central aperture for the reception, and a suitable set screw for securing and retaining rigidly in position, the lower carbon 20.

Supported on the upper flange of the center table are the four posts 21, 22, 23 and 24 rigidly secured to but insulated from said flange. 25 and 26 designate contact plates secured to but insulated from the bottom of the posts 22 and 23 respectively to which contact plates are connected the wires hereinafter referred to. Mounted between the posts 21 and 22 is the solenoid 27, and between the posts 23 and 24 is the solenoid 28. These solenoids are retained in their proper positions transversely and vertically by the retaining-plates 29 provided with the transversely extending projections 30 with suitable apertures whereby they may be easily slipped onto the posts, and provided also with the vertical projecting studs 31 whereby the solenoids, when the retaining-plates are placed in positon, will be retained in accurate position. As plainly shown in Fig. 5 these retaining-plates each are provided with ample openings whereby in the assembling or disassembling of my device the armature may be easily inserted. On the posts 21, 22, 23 and 24, underneath and also above the retaining-plates 29, are provided the coil-springs 32 the function of which springs is to neutralize or absorb the vibration of the solenoids when alternating current is in use in the operation of the lamp, as will be hereinafter referred to.

33 and 34 designate oppositely positioned standards the bases of which are rigidly secured to the tops of the posts 24 and 21, 22 and 23 respectively. These standards are provided at the upper ends with transverse holes in which reside the narrow-strip bearings 35 of the walking-beam 36. This walking-beam has the arms 37 and 38 the functions of which will be hereinafter explained, and is so formed on its upper face that suitable vertical faces are provided, against which are held rigidly in position the narrow-strip bearings 35, all as plainly shown in Fig. 5. By this construction are obtained bearings for the walking-beam of minimum friction. Apertures are provided in the outer ends of the arms 37 in which are inserted the detachable links 38ª upon which are suspended at proper height the armatures 39. Pivotally supported by the pins 42ª on the arms 38 are the suspenders 40 of suitable length and provided at their lower ends with the longitudinal slots 41 in which slots are loosely supported the cross-beam 42 provided at its center with the downwardly extending sleeve against the bottom of which is secured, but insulated therefrom, the contact plate 44.

Secured rigidly in the cross-beam 42 and sleeve 43 is the vertically disposed rod 45 its upper portion being held slidingly in true position by the horizontally projecting lug 34ª of the standard 34, and its lower portion being retained slidingly in true position in the column 11 which constitutes suitable guide and insulation for same as shown in Fig. 4. Secured to the lower end of this rod 45 is the bar 46 to the free end of which is slidingly and pivotally connected the vertical bar 47 its lower end being pivotally connected to the outer end of the clutch 48 a detail of which is shown in the detached view Fig. 9. This clutch is made of suitable non-conducting heat-resisting rigid material, preferably of lava, and taken in connection with my ingenious device for its actuation and operation forms one of the features of my invention. This clutch is provided at its free end portion with suitable vertically extending aperture through which the movable carbon 49 passes freely; normally this clutch 48 rests on the plate 16, the bar 46 in the top of the slot of bar 47, and the cross-bar 42 resting in the bottom ends of the slots 41, the walking beam being in its normal horizontal position, and the carbons in contact. It will be readily seen that when the walking-beam is actuated the vertical rod 45 will be raised thus the hinged end of the clutch will be raised and the clutch will immediately grip the carbon 49 and it will simultaneously be raised.

The description hereinafter of the wiring and the switch mechanism will disclose that the solenoids 27 and 28 will be energized alternately at certain intervals, which operation, by the magnetization alternately of the armatures 39 will cause the actuation of the walking beam.

After the carbon has been raised, the tendency would be for the rod 45 and its connected parts and the carbon 49 to drop forcibly; to overcome this and also to prevent the sudden jerk or twitch of the walking beam when the circuit is switched, I have provided the dash-pot 50 pivotally secured at its top by suitable arm to one of the suspenders 40 and the piston rod thereof pivotally secured at its lower end, by suitable arm, to the opposite suspender 40, thus is afforded sufficient cushion whereby sudden movement of the walking beam is prevented and the descent of the carbon may be rendered noiseless and steady.

Rigidly secured to the flange 8 of the metallic center-table and insulated therefrom is the standard 51 having the integrally formed, horizontally extending base portion 52 raised and free from the flange so as to make room for the passing of wires thereunder and to afford base for the rigidly secured vertically extending resilient rod 53 and the heat-coil 54 covered by a suitable jacket, which rests upon said base but is insulated therefrom as shown in Fig. 12. The upper portion of the standard 51 is provided with the projection 55 where it is rigidly secured to but insulated from the standard 33 the purpose of which is thus to stiffen the structure. Pivotally secured to the flange 56 of the standard 51 depends the rocker-bar 57 of suitable length and provided at its lower end with the studs 58 and having its end terminated in such form that the end 59 of the rocker-bar may pass the shaft 60 upon which is pivotally supported the snap-switch 61, as shown in Fig. 1 and Fig. 11. This snap-switch is formed of sheet metal U-shaped in cross section, pivoted near its upper end, having the upwardly extending arm 62 and the downwardly extending tongue 63, the latter being twisted so as to extend transversely and provided with the well known thin-strip contacts on either side thereof. Connecting transversely the two sides of the snap-switch is the small shaft 64. Pivotally connected to the lower end 59 of the rocker bar is the slide-bar 65 its free end bifurcated and adapted to reside slidingly upon the shaft 64; 65$^a$ designates a coil spring surrounding the slide-bar 65, its opposite ends bearing against the head of the slide bar 65 and the shaft 64, as plainly shown in Fig. 11.

66 and 67 designate contact posts secured to but insulated from the standard 51, their rear ends extending through the standard and adapted to receive the certain wires to be hereinafter, in the diagrammatic view, referred to. To facilitate the procurement of nice contact of the posts 66 and 67 with the snap-switch, the suitable thin-strip contacts aforesaid have been provided.

Rigidly secured to the top of the resilient post 53 that has its bottom secured to the base 52 is the horizontal bar 68 its one end being connected to the rod 53$^a$ that extends downwardly and is secured to the base 52. About this rod 53$^a$ is retained the heat coil 54 properly insulated from the said rod, the base 52, and the bar 68. The opposite end of the bar 68 is pivotally connected to the rocker bar 57 that is pivotally supported by the flange 56 of the standard 51 as hereinbefore described. It is obvious that by the slightest increase of the distance between the base 52 and the bar 68 at the rod 53$^a$, the bar 68 will be moved. With the parts arranged as just described the direction of such movement of the bar 68 will be in a line drawn through the rod 53$^a$ and the post 53, and toward the rocker bar. As the rod 53$^a$ becomes heated such elongation thereof due to its expansion, occurs, that the bar 68 is moved in the manner aforesaid. With the cooling of the heat coil and the rod 53$^a$, the bar 68 will be returned to its normal position as it appears in Fig. 1.

69 designates a protruding horizontal lug on the side of the standard 51 provided as a guide upon which the rocker bar may slide. 70 designates a suitable binding post on the snap-switch for securing thereto certain wires to be hereinafter described. These parts all when in normal position appear as shown in Fig. 1 and Fig. 10, the rocker-bar 57 having its lower end disposed toward the left with its stud 58 holding the snap-switch normally in contact with the contact-post 66. It will be understood that a very slight movement toward the right at that portion of the rocker-bar where the horizontal bar 68 is pivoted, is required to obtain the stroke necessary at the line of the studs 58, and that a slight expansion of the heat-coil 54 will cause a movement of the horizontal bar 68. This horizontal bar 68 being connected to the rocker-bar in the manner as heretofore stated, and rigidly secured to the resilient rod 53 against perpendicular movement, will, by the considerable power exerted by the expansion of the heat-coil be warped forwardly.

As it proceeds, the coil-spring 65$^a$ is strained and when the rocker-bar passes the center of its stroke, the snap-switch instantly severs its contact with post 66 and makes instant contact with post 67 where it remains in contact as the rocker-bar proceeds until the stud 58 stops its progress; with the cooling of the heat coil, due to its having been short-circuited as will be hereinafter described, the rocker bar moves rearwardly; as it recedes, the coil spring 65$^a$ is strained and when the rocker-bar passes the center of its stroke, the snap-switch instantly severs its contact with contact-post 67 and makes instant contact with post 66, where it remains in contact as the rocker-bar recedes until the stud 58 stops its recession.

71 designates a suitable switch for opening the circuit between the binding posts N and P.

72 designates suitable means secured to the top of the crown plate whereby the lamp may be supported.

In the construction and operation of series arc lamps as at present devised the well known shunt coil is the means employed whereby the retaining of proper distance apart of the carbons is sought to be accomplished. The objection to this is that a certain portion of the current is continually being consumed through the shunt coil, and the regulation of the arc is only partially accomplished, the carbons not infrequently coming into contact with each other and remaining in contact, or "sticking" and causing the extinguishment of the light. Also the length of the arc fluctuates so that a flickering and unsteady light results, and the continual fluctuation of the amount of current, due to the imperfect means of regulation of the length of the arc, is not remedied. Moreover the utility of lamps so devised depends upon the delicate adjustment and perfect working condition of the various parts, and upon the degree of temperature of such parts, more particularly of the shunt coil. The least amount of friction of the operating mechanism causes a corresponding variation in the adjustment of the lamp. The most serious objection however is, that in lamps, either shunt or differentially controlled, the variation in temperature to which all lamps are necessarily subject produces variation of the amount of the resistance of the shunt coil, thus is caused variation in the voltage at which such lamps will operate; this variation is commonly referred to as "volt creepage" or "creeping of the voltage around the arc of the lamp". And further, such lamps, owing to the difference in the nature of alternating and continuous current, must be constructed and the coils wound with particular reference as to whether same is to be operated by either continuous or alternating current.

Results of my invention are that many of the foregoing faults are overcome and by the improved combination and arrangement of the respective parts described the movable carbon is released and the arc is restruck of a certain length and at pre-determined intervals, irrespective of the arc voltage.

To accomplish perfect gaging of the distance apart of the carbons and so that the length of the arc may be gaged to operate upon a pre-determined voltage, the gaging device shown has been provided, composed of the suitably formed plate 73, its one end enlarged and formed curvilinear and with a curved scale marked thereon and rigidly secured to the stems 14 above the clutch 48. Pivotally secured to the face of this plate by the screw 73ª is the pointer 74 having an enlarged lower portion 74ª shaped into such curve, that when the pointer is adjusted with reference to the voltage desired to be consumed by the lamp, and so indicated on the scale, the portion 74ª will assume such position with reference to the clutch, that in the upward movement of the carbon 49 the clutch will be stopped at the proper predetermined position. At the opposite end of the pointer is provided a curvilinear slot within which resides the set screw 75 secured to the plate 73 whereby the pointer may be rigidly secured in desired position. By adjustment of the point of the pointer to the numeral on the scale, the precise adjustment of the carbons may be gaged and maintained.

76 designates the carbon-holder composed of a smoothly finished short metallic tube of suitable length, its lower end being slit, as shown in Fig. 13 and beveled slightly on its inner edge so that the carbon may be easily inserted and will be firmly retained therein. In the interior upper portion are the tongues 77 so adapted that when the carbon is inserted its passage beyond the proper distance is prevented.

78 designates a stud secured in the carbon holder adapted to protrude and to reside slidingly in the slot 5 of the sheath tube; this slot is of such length that the carbon-holder may not be pushed upwardly beyond its proper position, and when the carbon is consumed, may not travel downwardly beyond its proper position. Provided in the top of the carbon-holder is the suitable binding post 79 to which is secured the flexible conductor G as shown in Fig. 4. This flexible conductor is composed of flexible copper wire cable and is of such length that the carbon-holder in its movement upwardly and downwardly in the sheath-tube will be unhindered, and will always be in circuit.

It will be understood that all of the wires in the lamp and forming a part thereof are properly insulated, and are connected to the various contacts and binding posts in approved manner.

To assist to the clear understanding of the several views in the drawings, the wires are not shown, but their arrangement and connections will be clearly understood by inspection of the diagrammatic view as shown in Fig. 14.

In this improved lamp, when in readiness for operation, the parts are in the respective positions as shown in Fig. 1, Fig. 2 and Fig. 3, the carbons being in contact, the walking beam supporting the armatures of the solenoids being horizontal, both of the suspenders 40 and the cross-bar 42 being supported thereby, and the carbon-clutch being at rest on the disk 15, the contact plate 44 being in contact with the contacts 25 and 26, and the snap-switch in contact with the contact post 66. Continuous or alternating current may be introduced. With the opening of the switch 71 the current passes along the wire B to the contact plate 26 where it divides, a portion going through the plate 26, contact 44 and plate 25 and the resistance-coil C to the post N. Thus is provided a circuit for the current when the carbons will have been consumed. The remainder of the current passes along the wire D, the line of least resistance, through the contact 66 and snap-switch 63, thence along wire E around solenoid 27 thence through the heat-coil 54 made of German silver or other suitable resistance wire, thence along the wire F through collar 3 and flexible-conductor G through the movable carbon 49 and the fixed carbon 20, thence along the rod 18 and the wire H to the post N. The armature of solenoid 27 is thus first energized and moves downwardly, actuating the walking beam and causing upward movement of the cross-bar 42 supported by the suspender 40, and secured to the plate 44, thereby lifting the plate 44 and opening the circuit through the starting resistance coil C whereby the entire force of the current is spent in the circuit D described. The adjustment of the mechanism is such that instantly after the raising of the plate 44 the carbon-clutch 48 has grasped the carbon 49 and separated same from the fixed carbon 20, thus causing the arc to be produced. As the current continues to flow through the circuit D the heat-coil 54 expands, causing gradual movement of the rocker-bar 57 which causes the coil spring 65ª to be strained and instantaneous transposition of the snap-switch 63 which then contacts with the post 67, thus opening the circuit D and rendering inoperative the solenoid 27; thus, the current flowing in through the post P along the wire B passes along wire I around solenoid 28 through the snap-switch 63 through post 67 and along the wire J, it being the line of least resistance, thence along wire F, through the collar 3 and flexible conductor G, thence through the carbons, the rod 18 and wire H as hereinbefore described.

By the short circuiting, as described, of the solenoid 27 whereby it is rendered inoperative, the carbon 49 drops; the passing of the current through solenoid 28 causes again the actuation of the walking beam whereby the carbon is again instantly raised and the arc continued. As the arc is continued to be produced by this circuit the heat-coil 54 gradually cools and shrinks and allows the rocker-bar to reassume its initial position, the snap-switch again coming into contact with the post 66 and reëstablishing the circuit through D as hereinbefore described. So long as the current continues to flow, the operation of the lamp as described, will continue. The adjustment shown herein causes a change in magnetization of the solenoids to occur at intervals of about five to ten minutes each; by this adjustment the amount of carbon consumed between changes is so slight that the raise or increase of the arc voltage does not exceed one or two volts, whereas in lamps controlled by either the shunt or differential principle, with the construction and arrangement of parts for the operation of same as have been hitherto devised, the arc voltage will "creep" from five to twenty five volts.

When, by the consuming of the carbon 49, the carbon-holder in which it is retained has reached its lowermost position, as determined by the slot 5 in the sheath-tube, as shown in Fig. 8, the circuit D will be opened, and the "starting resistance" circuit through the coil C contact plates 25 and 26 the switch 44 and the wire B will be reëstablished.

What I claim as my invention and desire to secure by Letters Patent, is:

1. In an electric arc lamp, a circuit that is divided, an electro responsive device in each division of the circuit, a movable member adapted to be actuated by said electro responsive devices, a clutch to engage the movable electrode, means to cause the electro responsive devices to be alternately energized, connections between said movable member and the clutch so that with each movement of the movable member the clutch will release and then pick up the movable electrode.

2. In an electric arc lamp, a circuit that is divided, an electro-responsive device in each division of the circuit, a movable member adapted to be actuated by said electro-responsive devices, a clutch to engage the movable electrode, a thermostat to cause the electro responsive devices to be alternately energized, connections between said movable member and the clutch so that with each movement of the movable member the clutch will release and then pick up the movable electrode.

3. In an electric arc lamp, a circuit that is divided, a movable electrode, an electro-responsive device in each division of the circuit, a walking-beam adapted to be actuated when said electro-responsive devices are energized, a clutch to engage the movable electrode, means to cause the electro-responsive devices to be alternately energized, connections between the said walking beam and the clutch so that with each movement of the walking-beam the clutch will release and then pick up the movable electrode.

4. In an electric arc lamp, a circuit that is divided, a movable electrode, a solenoid in each division of the circuit, a walking beam to the end of which the cores of the solenoids are connected, a clutch to engage the movable electrode, means controlled by the current in the circuit to cause the solenoids to be alternately energized, connections between the said walking-beam and the clutch so that with each movement of the walking-beam the clutch will release and then pick up the movable electrode.

5. In an electric arc lamp, a circuit that is divided, a movable electrode, a solenoid in each division of the circuit, a walking-beam to the ends of which the cores of the solenoids are secured, a clutch to engage the movable electrode, a switch to throw the current from one solenoid to the other, a thermostat actuated by the current in the circuit to move the said switch, connections between the said walking-beam and the clutch so that with each movement of the walking-beam the clutch will release and then pick up the movable electrode.

6. In an electric arc lamp, a circuit through the lamp that is divided, a movable electrode, a solenoid in each division of the circuit; a walking-beam to the opposite ends of which the cores of the solenoids are secured, a clutch to engage said movable electrode, a trip for said clutch, means to switch the current of said circuit through the said solenoids alternately, a pair of vertical bars pivotally connected to said walking-beam, one on each side of the center thereof and slotted at their lower ends, there being an arm extended from each of said vertical bars and centered one above the other and having a cushioning device between said arms, a cross-bar having its ends slidingly secured to the lower ends of said vertical bars and having a vertical bar secured thereto with its lower end pivotally connected to said clutch, substantially as described.

7. In an electric arc lamp, an electric circuit through the lamp that is divided, a movable electrode, a solenoid in each division of the circuit, a walking-beam to the opposite ends of which the cores of the solenoids are secured, a ring-clutch to engage said movable electrode, a platform for said ring-clutch to rest on, means to switch the current of said circuit through said solenoids alternately, a pair of vertical bars pivotally connected to said walking-beam one on each side of the center thereof and slotted at their lower ends, a cross-bar having its ends slidingly secured to the lower ends of said vertical bars and having a vertical bar secured thereto with its lower end pivotally connected to said ring-clutch, substantially as described.

8. In an electric arc lamp, an electric circuit through the lamp that is divided, a movable electrode, a solenoid in each division of the circuit, a walking-beam to the opposite ends of which the cores of the solenoids are secured, a ring-clutch to engage said movable electrode, a platform for said ring-clutch, to rest on, means to switch the current of said circuit through said solenoids alternately, a pair of vertical bars pivotally connected to said walking-beam one on each side of the center thereof and slotted at their lower ends, a cross-bar having its ends slidingly secured to the lower ends of said vertical bars and having a vertical bar secured thereto with its lower end pivotally connected to said ring-clutch, a resistance circuit, a bridging member carried by the said vertical bar to connect the said resistance circuit with the main circuit, substantially as described.

9. In an electric arc lamp, a movable electrode, a circuit that is divided, a solenoid in each division of the circuit, a switch, a thermostat influenced by the current of the circuit to cause the switching of the current to the solenoids alternately, a clutch to engage the movable electrodes, a platform for the clutch to rest on, mechanisms having connections with the cores of said solenoids and with the said clutch so that with the switching of the current of the circuit from one solenoid to the other the electrode will be released and then picked up.

10. In an electric arc lamp, the combination of a frame, a movable electrode, a pair of uprights on each side of said frame, a solenoid supported by and between each pair of uprights, a pair of transverse standards supported by and joining the upper ends of said pairs of uprights at a right angle thereto, a walking-beam pivotally supported on said standards divided at its center and having knife-edge bearings to rest on said standards, and having its ends adapted to be secured to the cores of the solenoids, and secondary arms extending therefrom to engage the connections for engagement of the electrode, substantially as described.

11. In an electric arc lamp, a guide for a movable electrode, means for moving and holding the said electrode, a clutch secured to said moving and holding means and engaging the electrode, a transverse plate supported adjacent said electrode and above the clutch, a member disposed on said plate with the lower side thereof in position to engage and stop the movement of the clutch, and means for holding the said member in different positions.

12. In an electric arc lamp, a guide for a movable electrode, a pair of posts oppositely located parallel with the movable electrode when in position, means for moving and holding the electrode that lies between said posts, a clutch secured to said moving and holding means and engaging the electrode, a transverse plate secured to said posts, a member pivoted to said plate with the lower side thereof in position to engage and stop the movement of said clutch, and means for holding the said member in different positions.

13. In an electric arc lamp, a guide for a movable electrode, means for moving and holding the said electrode, a clutch secured to said moving and holding means and engaging the electrode, a transverse plate supported adjacent the electrode, and above the clutch, a member pivotally disposed on said plate the lower side of said member being adapted to engage and stop the movement of the clutch, and having a pointer thereon, and means for setting and holding the said member in different positions.

In testimony whereof I have signed my name to this specification in the presence of two subscribing witnesses.

WILLIAM F. WARNER

Witnesses:
JOHN J. HARTLEY,
CLARA A. PRIDDY.